Sept. 6, 1949.       R. DALLY       2,480,907

PHONOGRAPH PICKUP

Filed June 20, 1945

INVENTOR
Roy Dally
BY
Emery, Varney, Whittemore & Dix
ATTORNEY

Patented Sept. 6, 1949

2,480,907

UNITED STATES PATENT OFFICE 2,480,907

PHONOGRAPH PICKUP

Roy Dally, Racine, Wis., assignor to Electrovox Company, Inc., East Orange, N. J., a corporation of New Jersey Application June 20, 1945, Serial No. 600,613

8 Claims. (Cl. 179—100.41)

This invention relates to pick up cartridges for phonographs, and pertains particularly to the moving mechanical system which follows the undulations of the groove of a record and is connected to a suitable electric current generator such as a Rochelle salt piezo-electric crystal generator or the like adapted to generate electrical currents at voltages proportional to the motion transmitted thereto by the moving system. The electrical currents so generated are conducted to suitable amplifiers, of course, for amplification for use in suitable loud speakers.

In the following description of my invention, it will be understood that I am using the terms "moving mechanical system," or more briefly "moving system" to include only the moving parts which transmit mechanical motion to the electric generator, and that such terms, as used herein exclude all parts of the electric generator, even though such parts are moved by or move with the parts of the moving system as so defined.

In the process of picking up vibrations recorded in the undulations of the grooves of either laterally or vertically cut records, using a needle as the record contacting member, serious problems of mass, inertia and velocity are encountered, as may be realized from the fact that in the case of a symphonic recording, for example, it may be required to reproduce simultaneously frequencies varying from less than fifty cycles per second to above ten thousand cycles per second. The greater the mass of the record engaging needle and any other part to which the needle is rigidly connected, the greater the inertia, and the greater the inertia, the more reluctant is the response of the moving system to changes in direction imposed by the undulations in the groove.

In prior pick up cartridges with which I am familiar, including those invented by me, as represented by my prior Patents Nos. 2,145,389, 2,160,793, 2,261,616 and 2,313,324, for example, the record engaging needle has been rigidly secured to a supporting member, sometimes referred to as a chuck, of relatively large mass, which said chuck has been carried in resilient bearings in a suitable casing, and has been connected, by means of a suitable cushioned clamp, to one end of a piezo-electric crystal unit, the cushioning being supplied by resilient material such as rubber interposed between the clamp and the crystal unit. In some cases the record engaging needle has been permanently secured to the chuck. In other cases the needle has been held in the chuck by a set screw. In either case, the entire assembly of needle and chuck, including the bearing trunnions, clamp and cushioning material has comprised a moving system which vibrated as a unit in accordance with the undulations of the record groove, and this moving system has necessarily involved considerable mass.

Because of the relatively large mass of the moving system, it has been regarded as necessary to cause the needle to engage the record groove at considerable vertical pressure. Otherwise the relatively massive moving system was not responsive to the undulations of the record groove. Vertical pressures of six ounces or more have not been uncommon, and the lowest vertical pressure of which I am aware in commercial use is in the neighborhood of one ounce. Vertical pressures of substantial magnitude are disadvantageous, first, because they cause extraneous noise, and second, because the greater the vertical pressure the greater the wear on both the record and the needle point.

Moreover the relatively massive moving system has introduced resonance in the moving system which has inevitably created distortion in reproduction at certain frequencies. In an effort to reduce resonance, damping blocks have been employed, but such blocks, having internal friction, have caused loss of energy. In order to overcome this loss, greater vertical pressures have been required with the attendant disadvantages above mentioned.

It is an object of the present invention to provide an improved pick up having a moving system which, by greatly reducing the mass of the needle and needle support or chuck assembly, with resulting reduction in inertia, overcomes the disadvantages above mentioned. Among the advantages of the invention may be mentioned (1) improved fidelity of reproduction, (2) avoidance of resonance and consequent avoidance of necessity for damping, (3) reduction of frictional losses, resulting in improved efficiency in transmission of energy to the electric generator, and (4) reduction in vertical pressure of the needle in the record groove.

Other objects and advantages of the invention will appear hereinafter.

A preferred embodiment of the invention selected for purposes of illustration is shown in the accompanying drawings, in which, Figure 1 is a plan view of the pick up, the upper casing member having been removed.

Figure 1:
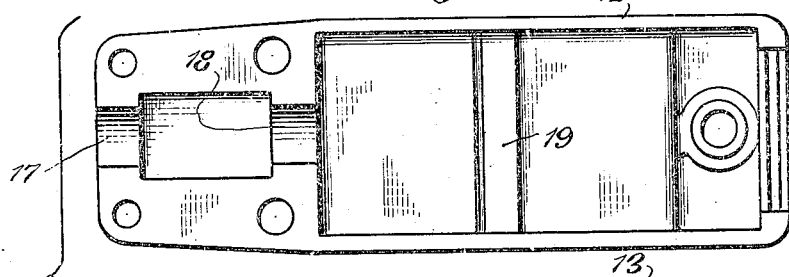
Figure 2:
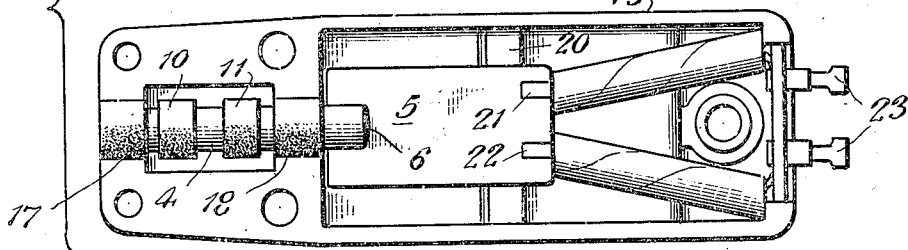
Figure 2 is a longitudinal section.
Figure 3:
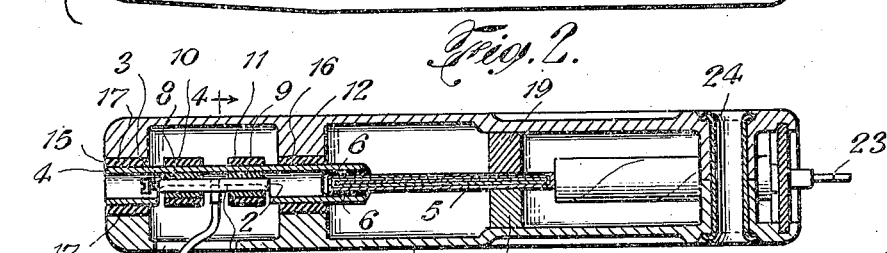
Figure 3 is an end elevation.
Figure 5:
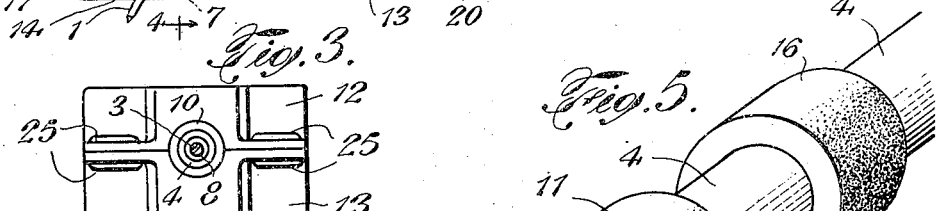
Figure 5 is an enlarged perspective view, partly in section of parts of the moving mechanical system.
Figure 4:
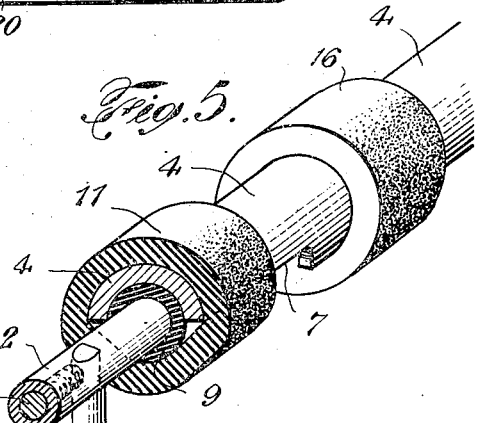
Figure 4 is a transverse section on the line 4—4 of Figure 3.
Figure 4:
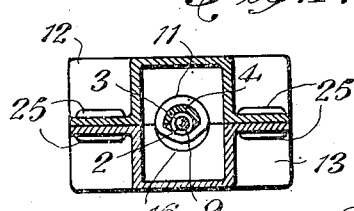
Figure 6:
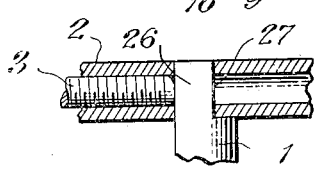
Figure 6 is an enlarged longitudinal section through the chuck, showing the manner of aligning a needle therein.

According to the present invention, I divide the present rigid moving system, which is connected to the crystal element through a cushioned clamp, into a primary moving system and a secondary moving system, with a resilient joint between the two moving systems. The primary moving system comprises a record engaging needle and a needle support or chuck rigidly connected thereto for supporting the same. The secondary moving system comprises a member secured directly to an electric generator. The resilient joint between the two moving systems comprises one or more members of suitable resilient material such as rubber adapted to transmit the motion of the primary moving system to the secondary moving system. By thus dividing the moving mechanical system into primary and secondary systems, the primary system may be extremely light, so that the mass of the primary system is less than one-half of the total mass of the entire moving mechanical system.

Thus, referring to the drawings, wherein I have illustrated a preferred embodiment of the invention, the primary moving system comprises a needle 1 of any suitable type and a needle support or chuck 2, the needle being disposed substantially at right angles to the axis of its support. Both needle shank and chuck are preferably made of light metal such as aluminum alloy or magnesium alloy, the latter being preferred, particularly for the needle shank. The needle, of course, must be provided with a hard record engaging point, as by securing a jewel or hard metal alloy point thereto. The chuck is preferably tubular, and is illustrated as adapted for changeable needles, the inner wall of the tube being threaded to receive a very small set screw 3. It will be understood, however, that the needle may be permanently secured to the needle support or chuck, if desired.

The resulting assembly is extremely light but has great stiffness. For example, if properly designed, the weight of the entire needle and chuck assembly need not exceed the weight of the needle alone as used in the conventional cartridge. In this connection it may be pointed out that because of the greater efficiency in the transmission of energy, because of the reduced mass of the primary moving system and because of the lesser vertical pressure required, the thickness of the needle shank may be safely reduced from conventional dimensions.

The secondary moving systems of the embodiment illustrated comprises a tubular sleeve 4, also preferably made of aluminum alloy or magnesium alloy, which said sleeve is connected directly to the end of a crystal element 5. Such connection is preferably made by forming grooves in the end of the sleeve to receive the end of the crystal element, and by cementing the two parts firmly together as at 6. The sleeve is also cut away to provide an aperture 7 of a width and length to permit convenient insertion of the primary assembly.

The resilient joint between the primary and secondary moving systems of the embodiment illustrated comprises a pair of sleeves 8 and 9 of resilient material such as rubber, which said sleeves surround the chuck on either side of the needle and fit snugly against the inner wall of the sleeve 4 thus providing resilient bearings in which the needle support may oscillate around its axis as the needle follows the undulations of the record groove. The primary and secondary moving systems may be conveniently held together in proper operative relationship by an additional pair of rubber sleeves 10 and 11.

The parts thus far described may be housed in a suitable casing, the casing shown herein being of conventional design comprising a pair of so-called "half shells" 12 and 13 which are substantially identical except that the lower half shell 13 is provided with an aperture 14 to permit the needle to protrude. In the embodiment illustrated the sleeve 4 is carried in resilient bearings formed by rubber sleeves 15 and 16 which are firmly gripped by pairs of cylindrical grooves 17 and 18 formed in the half shells as shown, thus permitting the sleeve 4 to oscillate around its axis to impart torsional stresses to the crystal element 5 in accordance with the oscillations imparted to the sleeve by the needle and needle support.

The rear end of the crystal element is firmly gripped in the usual manner between a pair of flat resilient mounting blocks 19 and 20, also of rubber. Conventional conductors 21 and 22 are connected in the usual manner to the crystal element and may terminate in suitable plug elements 23 projecting from the half shells as shown. The half shells may be held together in any suitable manner, as by rivets 24 and 25.

In order to insure correct alignment and positioning the needle 1 in the chuck 2, the upper end of the needle shank may be cut away to provide a D-shaped portion 26 having a flat side 27 which is adapted to engage similar flat sides of D-shaped apertures in the top and bottom walls of the chuck. The shoulder at the bottom of the cut away portion engages the bottom of the chuck tube, thus insuring correct vertical positioning of the needle. Thus when the set screw 3 is tightened, the needle is necessarily aligned correctly due to the flat sides of the needle and chuck respectively. Furthermore, this construction insures that the needle is held very firmly and rigidly in the chuck.

In operation the extremely light primary moving system with its low inertia is able to follow the undulations of the record groove much more faithfully than the more massive moving system of conventional pick ups, even when operated at very much reduced vertical pressure. For example, I have obtained extremely favorable results when operating at a vertical pressure of one-half ounce, and under some conditions at a vertical pressure as slight as one-quarter of an ounce. The movements of the primary system, of course, are transmitted to the secondary system through the resilient joint, and in turn to the crystal element. Since the total frictional losses in the resilient joint and in the bearings of the secondary system are less than the total frictional losses in the bearings, clamp rubber and damping blocks of conventional pick ups, an increase in the efficiency of energy transmission is observable. Moreover no damping is required.

As a result of the free factors of reduced mass, increased efficiency and absence of damping, reproduction of a quality heretofore impossible has been achieved.

It will be understood that while piezo-electric crystal generators have been particularly referred to herein, as exemplifying a type of electric generator adapted for use in connection with my invention, the underlying principles of my invention relates primarily to the moving mechanical portion of a phonograph pick up rather than to the electric generator portion thereof, and may be applied in connection with the generators of other types.

It will also be understood that the invention may be variously modified and embodied within the scope of the subjoined claims.

I claim as my invention:

1. In a phonograph pick up, in combination, a primary moving system comprising a record engaging needle and a needle support rigidly connected thereto, a secondary moving system comprising a movable tubular member connected rigidly to an electric generator, means for supporting said needle support on said tubular member, a casing, bearings in said casing in which said tubular member is mounted to oscillate, and bearings within said movable tubular member in which said needle support portion of said primary moving system is mounted to oscillate, said needle and needle support being entirely supported by said movable tubular member.

2. In a phonograph pick up, in combination, a casing, an electric generator, a primary moving system comprising a record engaging needle having a needle support rigidly connected thereto, a secondary moving system comprising a movable tubular member, resilient bearings in said casing in which said tubular member is mounted to oscillate, said tubular member being rigidly connected to said electric generator, means for supporting said needle support on said tubular member, and a resilient joint between said primary and secondary moving systems mounted and retained within said tubular member and transmitting vibratory motion on said primary system to said second system and to said electric generator, the needle support portion of said primary moving system being mounted and retained within said resilient joint, and said primary moving system being entirely supported by said movable tubular member.

3. In a phonograph pick up, in combination, an electric generator, a casing, a record engaging needle, a needle support rigidly connected thereto, a movable tubular member rigidly connected to said electric generator, resilient bearings in said casing in which said tubular member is mounted to oscillate, means for supporting said needle support on said tubular member, said needle support being mounted and retained within said tubular member and entirely supported thereby, and a resilient joint between said needle support and said tubular member which transmits vibratory motion on said needle and needle support to said tubular member and electric generator.

4. In a phonograph pick up, in combination, an electric generator, a record engaging needle, a needle support rigidly connected thereto, a movable tubular member rigidly connected to said electric generator, means for supporting said needle support on said tubular member said needle support being mounted and retained within said tubular member and entirely supported thereby, and a pair of rubber sleeves surrounding said needle support and engaging the inner wall of said tubular member to transmit vibratory motion of said needle and needle support to said tubular member and electric generator.

5. In a phonograph pick up, in combination, an electric generator, a record engaging needle and a needle support rigidly connected thereto, a movable tubular member rigidly connected to said electric generator, means for supporting said needle support on said tubular member, a casing, resilient bearings in said casing in which said tubular member is mounted to oscillate, resilient bearings within said movable tubular member in which said needle support is mounted to oscillate, said needle and needle support being entirely supported by said movable tubular member.

6. In a phonograph pick up, in combination, a casing, an electric generator a primary moving system comprising a record engaging needle and a needle support rigidly connected thereto, a secondary moving system comprising a movable tubular member connected to said electric generator, resilient bearings in said casing in which said tubular member is mounted to oscillate, means for supporting said needle support on said tubular member, and a resilient joint between said primary and secondary moving systems, said needle support portion of said primary moving system being mounted and retained within and entirely supported by said movable tubular member, the vibrations of said primary moving system being transmitted through said resilient joint to said movable tubular member and through it to said electric generator.

7. In a phonograph pick up, in combination, a casing, an electric generator a primary moving system comprising a record engaging needle and a needle support rigidly connected thereto, a secondary moving system comprising a movable tubular member connected to said electric generator, resilient bearings in said casing in which said tubular member is mounted to oscillate, means for supporting said needle support on said tubular member, and a resilient joint between said primary and secondary moving systems, said needle support portion of said primary moving system being mounted and retained within and entirely supported by said movable tubular member, the vibrations of said primary moving system being transmitted through said resilient joint to said movable tubular member and through it to said electric generator, the mass of said primary moving system being less than one-half of the total mass of the entire moving mechanical system.

8. In a phonograph pick up, in combination, a casing, a primary moving system including a record engaging needle, a secondary moving system comprising a tubular member mounted to oscillate in resilient bearings in said casing, and a resilient joint between said primary and secondary moving systems mounted and retained within said tubular member and transmitting vibratory motion of said primary system to said secondary system, and means for supporting said primary moving system entirely on said tubular member.

ROY DALLY.

REFERENCES CITED

The following references are of record in the file of this patent:

UNITED STATES PATENTS

| Number | Name | Date |
|---|---|---|
| 788,281 | Rinehart | Apr. 25, 1905 |
| 881,792 | Goldfaden | Mar. 10, 1908 |
| 1,669,170 | Nicolson | May 8, 1928 |
| 2,326,280 | Bauer | Aug. 10, 1943 |
| 2,348,526 | Dally | May 9, 1944 |
| 2,381,861 | Bauer | Aug. 14, 1945 |

FOREIGN PATENTS

| Number | Country | Date |
|---|---|---|
| 526,200 | Germany | June 3, 1931 |